US012736322B2

(12) United States Patent
Eames et al.

(10) Patent No.: US 12,736,322 B2
(45) Date of Patent: Sep. 15, 2026

(54) PIPE WEAR MONITORING SYSTEM AND METHOD OF USE THEREOF

(71) Applicant: 2C Holdings Pty Ltd, Erakala (AU)

(72) Inventors: Colin Neil Eames, Mooloolaba (AU); Corey Vaughan, Erakala (AU)

(73) Assignee: 2C Holdings Pty Ltd, Erakala (AU)

( * ) Notice: Subject to any disclaimer, the term of this patent is extended or adjusted under 35 U.S.C. 154(b) by 79 days.

(21) Appl. No.: 18/962,847

(22) Filed: Nov. 27, 2024

(65) Prior Publication Data

US 2025/0093145 A1 Mar. 20, 2025

Related U.S. Application Data

(63) Continuation of application No. 17/600,835, filed as application No. PCT/AU2020/050204 on Mar. 5, 2020, now abandoned.

(30) Foreign Application Priority Data

Apr. 4, 2019 (AU) ................................ 2019901154

(51) Int. Cl.

| | |
|---|---|
| ***G01B 7/06*** | (2006.01) |
| ***F16L 57/06*** | (2006.01) |
| ***F17D 5/02*** | (2006.01) |
| *G01B 11/24* | (2006.01) |

(52) U.S. Cl.

CPC ................ *G01B 7/06* (2013.01); *F16L 57/06* (2013.01); *F17D 5/02* (2013.01); *G01B 11/24* (2013.01)

(58) Field of Classification Search

CPC . G01B 7/00; G01B 17/02; G01B 7/06; G01B 11/24; G01D 11/30; G01N 29/04; G01N 29/24; F16L 57/00; F16L 57/06; F17D 5/02; F17D 5/06; G01F 1/66; G01F 1/667; G01F 1/84

See application file for complete search history.

(56) References Cited

U.S. PATENT DOCUMENTS

| | | | | |
|---|---|---|---|---|
| 9,335,298 | B2 * | 5/2016 | O'Keefe ............ | G01N 29/2437 |
| 2006/0048573 | A1 * | 3/2006 | Denny .................... | G01P 1/026 73/488 |
| 2019/0242728 | A1 * | 8/2019 | Low ....................... | G01B 11/24 |
| 2019/0390990 | A1 * | 12/2019 | Krywyj ..................... | G01L 9/04 |

* cited by examiner

*Primary Examiner* — Van T Trieu

(74) *Attorney, Agent, or Firm* — Harness, Dickey & Pierce, P.L.C.

(57) ABSTRACT

The present invention relates to a system and method for monitoring wear in pipes, particularly irregular wear in pipelines transporting abrasive fluids. The system includes a plurality of wear sensors spaced along a length of a pipe. Each wear sensor is configured to detect wear in a wall of the pipe. The system further includes at least one remotely accessible server operatively connected to the sensors for receiving and monitoring data output from said sensors. The server is configured to alert an operator when said data received from any one of the plurality of sensors is indicative of irregular wear in the wall of the pipe.

19 Claims, 8 Drawing Sheets

PIPE WEAR MONITORING SYSTEM AND METHOD OF USE THEREOF

CROSS-REFERENCE TO RELATED APPLICATIONS

This application is a continuation of U.S. patent application Ser. No. 17/600,835, filed Oct. 1, 2021, which is a 371 U.S. National Stage of International Application No. PCT/AU2020/050204, filed Mar. 5, 2020, which claims the benefit of Australian Patent Application No. 2019901154, filed Apr. 4, 2019. The disclosures of the above applications are incorporated herein by reference.

TECHNICAL FIELD

The present invention relates to a system and method for monitoring wear in pipes, particularly irregular wear in pipes and pipelines transporting abrasive fluids.

BACKGROUND

Pipeline transport is commonly used to transport materials through a system of pipes—a pipeline—typically to a market area for consumption or use. Generally, such pipelines may span several kilometres, in some cases hundreds of kilometres, and be used to transport crude and refined petroleum, fuels (e.g., oil, natural gas and biofuels) and other fluids, including sewage, slurry, tailings, or other heavy media materials.

A problem in general with such pipes or pipelines is that the pipes are prone to irregular wear, and in severe cases failure, when transporting abrasive materials, such as, e.g., slurry, tailings and other heavy media materials.

Current best practice is to continually inspect pipes and pipelines and implement corrective maintenance when and where failures are detected. While this practice may assist in early identification of pipe failures, it is not pre-emptive nor is it a time-or cost-effective approach, particularly when the pipes and pipelines may be located in remote and isolated areas.

SUMMARY OF INVENTION

Embodiments of the present invention provide a system, a sensor and a method of use for monitoring wear along a length of a pipe, which may at least partially address one or more of the problems or deficiencies mentioned above or which may provide the public with a useful or commercial choice.

According to a first aspect of the present invention, there is provided a pipe wear monitoring system including:

a plurality of wear sensors spaced along a length of a pipe, each wear sensor configured to detect wear in a wall of the pipe; and at least one remotely accessible server operatively connected to the sensors for receiving and monitoring data output from said sensors, said server configured to generate an alert when said data received from any one of the plurality of sensors is indicative of irregular wear in the wall of the pipe.

According to a second aspect of the present invention, there is provided a pipe wear monitoring system including:

at least one base station;

a plurality of wear sensors spaced along a length of a pipe and operatively connected to the at least one base station, each wear sensor configured to detect wear in a wall of the pipe; and at least one remotely accessible server operatively connected to the base station for receiving and monitoring data output from said sensors via said at least one base station, said server configured to generate an alert when said data received from any one of the plurality of wear sensors is indicative of irregular wear in the wall of the pipe.

According to a third aspect of the present invention, there is provided a pipe wear monitoring system including:

at least one base station;

a plurality of sensor nodes operatively connected to the at least one base station, each sensor node operatively associated with at least one wear sensor spaced along a length of a pipe and configured to detect wear in a wall of the pipe; and at least one remotely accessible server operatively connected to the base station for receiving and monitoring data output from said sensors via said sensor nodes, said server configured to generate an alert when said data received from any one of the plurality of wear sensors is indicative of irregular wear in the wall of the pipe.

According to a fourth aspect of the present invention, there is provided a wear sensor for use in detecting irregular wear in a wall of a pipe, said sensor including:

a sacrificial probe configured to be at least partially inserted into an opening defined in an outer surface of a wall of a pipe and be at least partially destroyed in response to irregular wear on an inner surface of the pipe, the destruction of the probe being indicative of irregular wear being detected.

According to a fifth aspect of the present invention, there is provided a pipe wear monitoring system including:

a plurality of wear sensors according to the fourth aspect spaced along a length of a pipe; and at least one remotely accessible server operatively connected to the sensors for receiving and monitoring data output from said sensors, said server configured to generate an alert when said data received from any one of the plurality of sensors is indicative of irregular wear in a wall of the pipe.

Advantageously, the systems and methods of the present invention enable wear to be remotely monitored in a wall of a pipe. The systems and methods obviate the need for continuous inspections for pipe wall failures and associated costs by continuously or periodically monitoring the thickness of a pipe wall. When a pipe wall thins due to irregular wall, an alert is generated alerting an operator to replace a failing segment of pipe before it fails. Further, by providing advanced alerts of the failure of a pipe wall as opposed to reactive alerts, an operator is able to coordinate and plan maintenance and repair operations in a more time-and cost-effective manner than the current practice of continuous inspections.

As indicated above, the system and components thereof are for use with pipes, pipelines, and components and fittings thereof used to convey abrasive materials and, thus, prone to irregular wear and failure. Examples of such components and fittings include launders, shuts and bins.

A person skilled in the art will appreciate that the system may also be used with pipes, pipelines, and components and fittings thereof that convey any flowable material or materials that may at least partially degrade or corrode an inner wall of a pipe, component or fitting, such as, e.g., pipes that convey heavily acidic or alkalinic materials. Further, the system may be used with pipes, pipelines, and components and fittings thereof that may be subject to corrosion, such as, e.g., iron pipes.

Further, a person skilled in the art will appreciate that the system may be used with structure that has wear parts or units. For example, the system may be used with wear tiles or plates used in chute, a crusher, a feeder, a conveyor, a stacker or a grinding mill.

As used herein, the term "pipe" may encompass any tubular section used to convey flowable medium, such as, e.g., liquids, gases, slurries, powders and masses of small solids.

Typically, the pipe may include a pair of opposed open ends and at least one sidewall extending longitudinally between the ends. The at least one sidewall is usually curved such that the pipe has a circular profile shape, although non-circular shapes are also encompassed.

The pipe may be formed from any suitable material or materials capable of conveying the flowable medium. Generally, the pipe may be formed from ceramic, concrete fibreglass, composite, plastic and/or metal material or materials, typically steel, copper, aluminium, concrete or plastic material or materials, preferably steel or high-density polyethylene (HDPE).

In some embodiments, the pipe may be a wear resistant pipe.

For example, in some such embodiments, the pipe may have a thickened sidewall to at least partially delay wear failure. The sidewall of the pipe may have thickness of between about 1.5 mm and about 100 mm, for example.

In other such embodiments, the pipe may include a wear liner extending along an inner surface of the sidewall. The wear liner may be formed from any suitable wear resistant material, such as, e.g., ceramic.

As used herein, the term "pipeline" may encompass two or more segments or lengths of pipe joined end-to-end for conveying a flowable medium.

As used herein, the term "irregular wear" may include any non-uniform wear on an inner surface of a wall of a pipe.

Generally, the irregular wear may include a portion of the inner surface of the wall of the pipe that exhibits more advanced wear than other portions of the pipe. FIG. 1 shows an example of irregular pipe wear. Specifically, FIG. 1 shows a portion (14) of a pipe (10) exhibiting more advanced wear and thinning of the sidewall (12) than other portions (16) of the pipe (10).

Typically, the irregular wear may occur on an inner surface of a bottom or lower portion of the wall of the pipe generally corresponding to the surface most in contact with the materials being conveyed within the pipe, usually a slurry.

The wear sensors may be of any suitable size, shape and form for being spaced along a length of the pipe. The wear sensors may be fitted or installed on the pipe at the time of manufacture or may be retro-fitted to an existing pipe, typically the latter.

The wear sensors may be spaced at regular intervals along a length of the pipe, typically to a lower side or portion of the pipe. For example, the wear sensors maybe spaced at intervals of about 0.5 m, about 1 m, about 1.5 m, about 2 m, about 2.5 m, about 3 m, about 3.5 m, about 4 m, about 4.5 m, about 5 m, about 5.5 m, about 6 m, about 6.5 m, about 7 m, about 7.5 m, about 8 m, about 8.5 m, about 9 m, about 9.5 m, about 10 m, about 10.5 m, about 11 m, about 11.5 m, about 12 m, about 12.5 m, about 13 m, about 13.5 m, about 14 m, about 14.5 m, about 15 m, about 15.5 m, about 16 m, about 16.5 m, about 17 m, about 17.5 m, about 18 m, about 18.5 m, about 19 m, about 19.5 m or even about 20 m or more along a length of the pipe.

Each wear sensor may be fitted or installed to the sidewall of the pipe in any suitable way such that the sensor can detect wear in the wall of the pipe, preferably on an inner surface of the wall.

For example, in some embodiments, the wear sensors may be attached or fastened to an outer surface of the sidewall of the pipe with one or more fasteners, such as, e.g., one or more chemical fasteners and/or one or more mechanical fasteners.

In some such embodiments, each wear sensor may be fastened to the outer surface of the sidewall by one or more chemical fasteners. The one or more chemical fasteners may include a wet adhesive, a dry adhesive and/or double-sided adhesive tape extending between the sensor and the outer surface.

In other such embodiments, each wear sensor may be fastened to the outer surface of the sidewall by one or more mechanicals fasteners. The one or more mechanical fasteners may include one or more threaded fasteners or rivets.

In other embodiments, each sensor and the pipe may be attached or connected together by a connecting mechanism or part of a connecting mechanism. The connecting mechanism may include a first part associated with the sensor and a second part connectable to the first part associated with the sidewall of the pipe.

The parts of the connecting mechanism may include mateable male and female portions that couple together, included threaded connections, interference (snap fit) connections, and/or bayonet-type connections, for example.

For example, in some such embodiments, a first part of the connecting mechanism associated with the sensor may be include a male formation configured to be at least partially inserted into or coupled with a female formation of a second part of the connecting mechanism associated with the sidewall.

Conversely in other such embodiments, the first part of the connecting mechanism associated with the sensor may include a female formation configured to at least partially receive or couple with a male formation of the second part of the connecting mechanism associated with the sidewall.

In yet other embodiments, the wear sensors may be at least partially received in a sensor inlet port defined in the outer surface of the sidewall of the pipe. The sensor inlet port may include an opening defined in the outer surface of the sidewall of the pipe and extending partially towards an inner surface of the sidewall but not through the inner surface. Preferably, the sensor inlet port may include a threaded inner surface for threadingly engaging with an outer surface of the wear sensor.

As indicated, the wear sensors may be of any suitable type capable of detecting wear in the sidewall of a pipe.

For example, in some embodiments, the wear sensor may include a temperature sensor capable of detecting a change in temperature relating to the flowable medium temperature and corresponding to a thinning of the wall of the pipe.

In such embodiments, the sensor may be at least partially received in a sensor inlet port in the wall of the pipe and detection of the flowable medium temperature may be indicative of wear in the wall of the pipe.

The temperature sensor may be a thermistor, a thermocouple, a resistance thermometer or a silicon bandgap temperature sensor, for example.

In other embodiments, the wear sensor may be an electric sensor configured to be associated with a sidewall of the pipe and generate a signal when the sidewall thins to a predetermined thickness, preferably an electronic signal.

In yet other embodiments, the wear sensor may be a sacrificial wear sensor. For example, the wear sensor may include a sacrificial probe configured to be at least partially destroyed in response to wear in the sidewall of the pipe, partial destruction of the probe being indicative of said wear being detected.

In such embodiments, the probe may preferably be an electronic sacrificial probe configured to generate a signal indicative of wear being detected. The signal may be an electronic signal or the absence of an electronic signal generated as a result of the partial destruction of the probe.

In preferred such embodiments, the sacrificial probe may include a board having at least one electrical circuit defined thereon. The board and the at least one circuit may be configured to be at least partially destroyed in response to wear in the sidewall of the pipe.

In other preferred such embodiments, the board of the sacrificial probe may have a plurality of electrical circuits defined thereon. The individual circuit and the board are configured to be sequentially destroyed in response to wear in the sidewall of the pipe. The sequential destruction of the individual circuits enables wear in the sidewall of the pipe to be incrementally monitored. Advantageously, this also enables a wear rate to be determined.

For example, in use, the electrical circuit may be continuously or periodically polled by the system. When the electrical circuit is intact, the circuit may generate a signal when polled indicative of the absence of irregular wear on the sidewall. When the circuit is at least partially destroyed, the circuit will not generate a signal when polled, thereby indicative of irregular wear on the sidewall.

The wear sensor may preferably include a body for at least partially housing the sacrificial probe and for connecting, fastening or attaching the wear sensor to the sidewall of the pipe. Typically, the body may be at least partially formed from the same material or materials as the pipe to which it is connected, fastened or attached.

Generally, the body may be of a corresponding size and shape to be securely received in the sensor inlet port. Typically, the body may have a substantially circular profile shape. Preferably, the body may have a substantially cylindrical shape.

The body may include a shank having a pair of opposed ends, a head at one of the opposed ends and a tip at the other of the opposed ends of the shank.

The shank may be sized and shaped such that it may at least partially extend within the sensor inlet port. The shank may be at least partially threaded, preferably along a portion of a length of the shank immediately adjacent the head. Preferably, the shank may include an external thread.

The shank may have any suitable thread profile to threadingly engage with an internal thread provided in the sensor inlet port. For example, the external thread may have a square, triangle, trapezoidal or other thread shape. Preferably, the threaded portion of the shank may have a square thread profile.

The head may preferably be an enlarged head sized and shaped such that it may not be received within the sensor inlet port but may abut against an outer surface of the wall of the pipe.

In some embodiments, the head may include a tool engaging formation, such as, e.g., a socket, formed in the head for receiving a tool for applying torque to the body and turning or rotating body relative to the sensor inlet port.

In other embodiments, the head may include a non-circular head profile shape for engaging with a tool for applying torque to the body and turning or rotating body relative to the sensor inlet port. For example, the head may include a hexagonal profile shape for engaging with a wrench or the like.

The tip of the body may be rounded, blunt or square-tipped. Likewise, a distal end of the shank at or near the tip may or may not be threaded.

The body may further include an internal passage extending through the body, preferably from the tip at least partially towards the head. The internal passage may be of any suitable size for receiving and holding in place the sacrificial probe. Typically, the passage may extend longitudinally through the body, preferably along a central axis of the body. The passage may have a circular profile shape for accommodating the sacrificial probe.

In some embodiments, the internal passage may include at least two sub-passages, including a first sub-passage extending from the tip of the body at least partially towards the head of the body for receiving and accommodating the sacrificial probe and a second sub-passage extending from the first sub-passage and entirely through the head of the body for the passage of any cables or wires connected to the sacrificial probe. The second sub-passage may have a narrower diameter or width than the first sub-passage to prevent passage of the sacrificial probe therethrough.

In use, the sacrificial probe may be inserted into the body via the tip prior to the sensor being at least partially inserted into and threadingly engaging with the sensor inlet port.

In some embodiments, the sacrificial probe may include at least one retaining portion for engaging with the tip of the body and preventing over-insertion of the probe into the body. Typically, the probe may include a pair of opposed retaining portions configured to engage with diametrically opposite sides of the tip of the body. In preferred such embodiments, the retaining portions may include a pair of outwardly turned end edges of the sacrificial probe configured to at least partially hook or clip over the tip of the body.

In some embodiments, each sensor may include a communications module for connecting the sensor to the at least one remotely accessible server or the base station. The sensor may connect to the server or the base station in any suitable way.

For example, the communications module may be in the form of a modem enabling the sensor to connect to the server or the base station via a wired or wireless network, preferably the latter.

In some embodiments, the communications module may include a port or access point (e.g., a USB port, a mini-USB port or an Ethernet port) such that the sensor may be connected to an external processing device, such as, e.g., the sensor node, using a suitable cable.

In other embodiments, the communications module may be a wireless communications module, such as, e.g., a wireless network interface controller, such that the sensor may wirelessly connect to the base station or the server through a wireless network (e.g., Wi-Fi (WLAN) communication, Satellite communication, RF communication, infrared communication, or Bluetooth™).

In yet other embodiments, the communications module may include at least one modem configured to be in wireless communication with the server or the base station for the transmission of data. In some such embodiments, the modem may be a cellular modem. In other embodiments, the modem may be a radio modem.

The communications module may be connected to the sacrificial probe by an electrical circuit, typically extending along at least one cable extending through the head of the body. The electrical circuit may include a data bus, a twisted pair network and/or a fibre optic network, for example. Excitation/operating voltage may be supplied over the circuit (such as POE) or separately.

In some embodiments, each sensor may further include a power supply for powering the sacrificial probe, the communications module and other electrical components of the sensor. The power supply may preferably include an on-board power source, such as, e.g., one or more batteries, preferably rechargeable batteries.

Each sensor may be addressable and may report an operational status to the sensor node, the base station and/or the remotely accessible server when polled or interrogated.

As indicated above, in some embodiments the system may include at least one base station operatively associated with the plurality of wear sensors and the remotely accessible server for at least relaying data between from the sensors and the server. The at least one base station may be of any suitable size, shape and construction and formed from any suitable material or materials.

Preferably, the at least one base station may function as a bridge between the plurality of sensors and the remotely accessible server.

Generally, the at least one base station may be located at or near the pipe so that the base station may be operatively associated with the plurality of sensors or a subset of the plurality. For example, in some embodiments, the at least one base station may be located at or near an end of the pipe or pipeline. In other embodiments, the at least one base station may be located at a position partially along a length of the pipe.

In some embodiments, the system may include more than one base station each operatively associated with a subset of the plurality of sensors. For example, the system may include at least two base stations, at least three base stations, at least four base stations or even at least five base stations. In such embodiments, the base stations may be located at spaced intervals along the pipe or pipeline.

The base station may include a body sized and shaped for housing components and/or parts of the system, including at least one power source and a communications module. Preferably, the body may be formed from a durable material or materials configured to withstand external environmental exposure, such as, e.g., plastic, concrete and/or metal material or materials.

As indicated, the base station may include a communications module for connecting to the plurality of sensors and the at least one remotely accessibly server. The base station may connect in any suitable way.

The communications module may preferably be a modem enabling the at least one base station to connect to the remotely accessible server via a wireless network (e.g., Wi-Fi (WLAN) communication, Satellite communication, RF communication, infrared communication, or Bluetooth™). For example, and as indicated above, in some embodiments, the modem may be a cellular modem. In other embodiments, the modem may be a radio modem.

As also indicated, the base station may include at least one power source for powering at least the communications module. In some embodiments, the power source may include an on-board power source, such as, e.g., one or more batteries. In other embodiments, the power source may include one or more photovoltaic cells, an inverter and one or more batteries for storing electricity generated and from which the base station may draw power. In yet other embodiments, the power source may include a mains supply.

In some embodiments, the at least one base station may include a microcomputer, including one or more processors and a memory, for receiving, monitoring and transmitting data between the remotely accessible server and the plurality of sensors. The one or more processors may be low power processors.

The processors may include multiple inputs and outputs coupled to the communications module for the receiving and transmitting of data. For example, in some such embodiments, the at least one base station may periodically or continuously address each sensor and report the operational status of the sensor to the server. The operational status may include whether the sensor is operational, i.e., intact, an indication of any faults reported by the sensor, and/or an indication of the status of the power supply.

As indicated above, in some embodiments, the system may include a plurality of sensor nodes each operatively associated with at least on wear sensor for at least relaying data between the sensor and the server, via the at least one base station. The sensor nodes may be of any suitable size, shape and construction and formed from any suitable material or materials.

Like with the base station, each sensor node may include a body sized and shaped for housing components and/or parts of the system, including at least one power source and a communications module. Preferably, the body may be formed from a durable material or materials configured to withstand external environmental exposure, such as, e.g., plastic, concrete and/or metal material or materials.

Each sensor node may be operatively associated with any number of wear sensors. For example, each sensor node may be operatively associated with one, two, three, four, five, six, seven, eight, nine, 10, 11, 12, 13, 14, 15, 16, 17, 18, 19 or 20 or more sensors.

Each sensor node may typically be operatively associated by a wired connection with the at least one wear sensor, although a wireless connection is also envisaged. Accordingly, usually each sensor node may be located at or near the pipe in the immediate vicinity of the plurality of wear sensors or a subset thereof to which it is connected.

For example, in some embodiments, each sensor node may be operatively associated with an outer portion of a head of a body associated with each wear sensor, preferably such that the sensor node may be connected to a portion of the head protruding from an outer surface of a wall of a pipe.

In some embodiments, the communications module may include a port or access point (e.g., a USB port, a mini-USB port or an Ethernet port) for connecting the sensor node to the sensors, using a suitable cable.

In some embodiments, the communications module may further include at least one modem enabling wireless communication with the at least one remotely accessible server via the at least one base station for the transmission of data between the sensor node, the at least one base station and the at least one remotely accessible server. The wireless communication may be via a wireless network (e.g., Wi-Fi (WLAN) communication, Satellite communication, RF communication, infrared communication, or Bluetooth™). Again, the modem may include a cellular modem or a radio modem.

The sensor node may preferably include at least one power source for powering at least the communications module. Typically, the power source may include an on-board power source, such as, e.g., one or more batteries, preferably rechargeable. In some embodiments, the power source may include one or more photovoltaic cells, an inverter and one or more batteries for storing electricity generated and from which the sensor node may draw power.

Again and like with the base station, in some embodiments, each sensor node may further include a microcomputer, including one or more processors and a memory, for receiving, monitoring and transmitting data between the at least one remotely accessible server, the at least one base station and the plurality of sensors. The one or more processors may be low power processors.

The processors may include multiple inputs and outputs coupled to the communications module for the receiving and transmitting of data. For example, in some such embodiments, each sensor node may periodically or continuously address each sensor operatively associated with the node and report the operational status of the sensor to the remotely accessible server via the at least one base station. The operational status may include whether the sensor is operational, i.e., intact, an indication of any faults reported by the sensor, and/or an indication of the status of the power supply (e.g., battery charge status).

Preferably, each sensor node may be configured to periodically or continually address each sensor it is operatively associated with and report the operational status of the sensor to the remotely accessible server via the at least one base station. In some embodiments, the sensor node may only report an irregular operational status. In other embodiments, the sensor node may report all operational statuses, including regular and irregular statuses.

The remotely accessible server may be any appropriate server computer, distributed server computer, cloud-based server computer, sever computer cluster or the like. The server may also typically include one or more processors and one or more memory units containing executable instructions/software to be executed by the one or more processors. Generally, the server may be in communication with at least one database.

For example, in some embodiments, the server may be in communication with a pipe database containing a plurality of sensor records for each pipe being monitored. The server may preferably be linked to or may maintain the pipe database. Each sensor record may include a sensor identifier. Each sensor record may further include a past record of the data output for the respective sensor.

In some embodiments, the remotely accessible server may additionally collect and record the data output from said sensors in the pipe database, preferably against a sensor record corresponding to a respective sensor.

In some embodiments, the remotely accessible server may further continuously or periodically monitor the pipe database for changes in the data output for any one of the plurality of sensors. The remotely accessibly server may generate an alert when a change in the data output is indicative of a change in sensor operational status, such as, e.g., a sensor fail or failing sensor (imminent failure). The alert may be generated to a computing device of an operator or the like. The alert may be an electronic notification as will be described later.

As indicated above, the server may generally be in communication with the plurality of sensors either directly or via one or more of the sensor nodes and the at least one base station.

The remotely accessible server may be configured to transmit communications to and receive communications from the sensors, the sensor nodes and/or the at least one base station over a communications network, which may include, among others, the Internet, LANs, WANs, GPRS network, a mobile communications network, a radio network (UHF-band), etc., and may include wire and/or wireless communication links, preferably the latter.

In some embodiments, the communications may be received and transmitted via a private network connection established between the sensors, the sensor nodes and/or the at least one base station and the remotely accessible server.

For example, in some embodiments, the private network connection may be a secure communication session across an encrypted communication channel such as Hypertext Transfer Protocol Secure (HTTPS), Transport Layer Security/Secure Sockets Layer (TLS/SSL) or some other secure channel.

In other embodiments, the private network connection may be a VPN connection established using an encrypted layered tunnelling protocol and authentication methods, including identifiers, passwords and/or certificates.

For example, in some such embodiments, the sensors, the sensor nodes and/or the at least one base station may each be assigned a unique identifier that may be registered with the server. In use, the server may establish a VPN connection with the sensors, the sensor nodes and/or the at least one base station upon authenticating the identifier assigned to the sensors, the sensor nodes and/or the at least one base station.

In such embodiments, the server may be in communication with at least one identifier database containing the plurality of identifiers. The server may look-up an identifier in the database to authenticate the sensors, the sensor nodes and/or the at least one base station. The server may again be linked to or may maintain the database containing the plurality of identifiers.

As indicated, the at least one remotely accessible server may at least receive and monitor data output from the plurality of sensors, preferably on a real-time basis. Preferably, the server may monitor the data received for any changes indicative of: an abnormal sensor operating condition; a sensor failure; and/or irregular wear in the wall of the pipe to which the sensor is associated. For example, an abnormal sensor operating condition may include, inter alia, a low power warning or a high operating temperature warning. A failure may include, inter alia, an open circuit, a short circuit or a power source failure.

Responsive to the remotely accessible server identifying data indicative of irregular wear, the server may generate an alert to a computing device of an operator or the like advising of the irregular wear.

An alert generated by the remotely accessible server may preferably be an electronic notification and may be effected by way of Short Message Server (SMS) protocol, Unstructured Supplementary Service Data (USSD) protocol, over a secure Internet connection, or by way of data communication enabled by a software application installed on the computing device, for example.

The computing device may include a computer, a tablet, a smart phone, a smart watch or a PDA, for example. The computing device may be connected to the at least one remotely accessible server by a wired connection or a wireless connection via a wireless network (e.g., Wi-Fi (WLAN) communication, RF communication, infrared communication, or Bluetooth™), preferably the latter.

In some embodiments, the system may include software configured to be run on the sensors, the sensor nodes, the at least one base station, the remotely accessible server and/or the computing device of the operator or the like. The software may preferably be interactive. In some such embodiments, the software may be in the form of an application (i.e., an app) configured to be run on a smart phone, a tablet or other mobile computing device, for example.

In other embodiments, the remotely accessible server may include a web server providing a graphical user interface through which the operator or the like may interact with the system and the remotely accessible server. The web server may accept requests, such as HTTP requests and server responses, such as HTTP responses, along with optional data content, such as web pages (e.g., HTML documents) and linked objects. Generally, the web server may enable the operator and the like to receive and transmit communications with the remotely accessible server and with the sensors, the sensor nodes and/or the at least one base station via the remotely accessible server.

According to a sixth aspect of the present invention, there is provided a wear monitoring system including:

- a plurality of wear sensors configured to be at least partially inserted in wear parts or units of a structure; and
- at least one remotely accessible server operatively connected to the sensors for receiving and monitoring data output from said sensors, said server configured to generate an alert when said data received from any one of the plurality of sensors is indicative of at least one of irregular wear or failure of any one of the wear parts or units of the structure.

The wear system may include one or more characteristics of the pipe wear monitoring system as hereinbefore described.

For example, the system may further include at least one base station and/or a plurality of sensor nodes as previously described.

The wear parts or units may generally be of any suitable size, shape and construction to be partially resistant to wear and to protect at least one side or internal side of the structure. The structure may be a chute, a crusher, a feeder, a conveyor, a stacker or a grinding mill.

Generally, each wear sensor may be at least partially inserted into a structure-facing surface of the wear part or unit.

According to a seventh aspect of the present invention, there is provided a method of monitoring pipe wear including:

- providing a plurality of wear sensors at spaced intervals along a length of a pipe, each sensor being configured to detect wear in a wall of the pipe; and
- receiving and monitoring data corresponding to data output from said sensors and generating an alert when data is received from any one of the plurality of wear sensors indicative of irregular wear in the wall of the pipe.

According to an eighth aspect of the present invention, there is provided a method of monitoring pipe wear including:

- providing a plurality of wear sensors according to the fourth aspect at spaced intervals along a length of a pipe; and
- receiving and monitoring data corresponding to data output from said sensors and generating an alert when data is received from any one of the plurality of wear sensors indicative of irregular wear in a wall of the pipe.

The method of the seventh or eighth aspects may include one or more characteristics of the system and/or sensor as hereinbefore described.

The receiving and monitoring of data may preferably occur via the remotely accessible server, which may be in wireless communication with the plurality of sensors, the plurality of sensor nodes and/or the at least one base station, preferably via a wireless network.

In some embodiments, each sensor node operatively associated with a plurality of sensors may periodically or continually address each sensor and report an operational status of the sensor to the remotely accessible server, optionally via the at least one base station. In some such embodiments, the sensor node may report when a sensor does not respond when polled, failure to respond being indicative of partial destruction of the sensor and thus irregular wear on a portion of the pipe adjacent the sensor.

The addressing of each sensor may include verifying that at least the sensor probe is intact. The verifying may include transmitting an electrical current through the electrical circuit provided on the sensor probe, wherein a closed circuit is indicative that the sensor probe is intact and wherein an interrupted or open circuit is indicative that the sensor probe has been partially destroyed and thus irregular wear has occurred on a portion of the pipe at least adjacent the sensor.

Conversely in other embodiments, the at least one base station and/or the remotely accessible server may periodically or continually address each sensor. In some such embodiments, the at least one base station may report an operational status of the sensor to the remotely accessible server. The at least one base station and/or the remotely accessible server may monitor each sensor for a response when polled, wherein the absence of a response may be indicative of partial destruction of the sensor and thus irregular wear on a portion of the pipe adjacent the sensor.

In such embodiments, the at least one base station and/or the remotely accessible server may instruct the sensor to verify that the sensor probe is intact. The verifying may include transmitting an electrical current through the electrical circuit provided on the sensor probe, wherein a closed circuit is indicative that the sensor probe is intact and wherein an interrupted or open circuit is indicative that the sensor probe has been partially destroyed and thus irregular wear has occurred on a portion of the pipe at least adjacent the sensor.

Responsive to the remotely accessible server identifying data indicative of irregular wear, the server may generate an alert advising of the irregular wear, typically the alert is transmitted to a computing or mobile device of an operator or the like.

The alert may be an electronic notification and may be effected by way of Short Message Server (SMS) protocol, Unstructured Supplementary Service Data (USSD) protocol, over a secure Internet connection, or by way of data communication enabled by a software application installed on the computing device, for example.

Upon receiving the alert, an operator or the like may schedule or commence repair or replacement of a portion of the pipe or pipeline corresponding to the irregular wear advantageously before pipe wall failure occurs.

Any of the features described herein can be combined in any combination with any one or more of the other features described herein within the scope of the invention.

The reference to any prior art in this specification is not and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of Invention in any way. The Detailed Description will make reference to a number of drawings as follows.

DETAILED DESCRIPTION

FIGS. 2 to 8 show embodiments of a pipe wear monitoring system (100) and parts thereof for monitoring wear along a length of a pipe (10).

Figure 1:
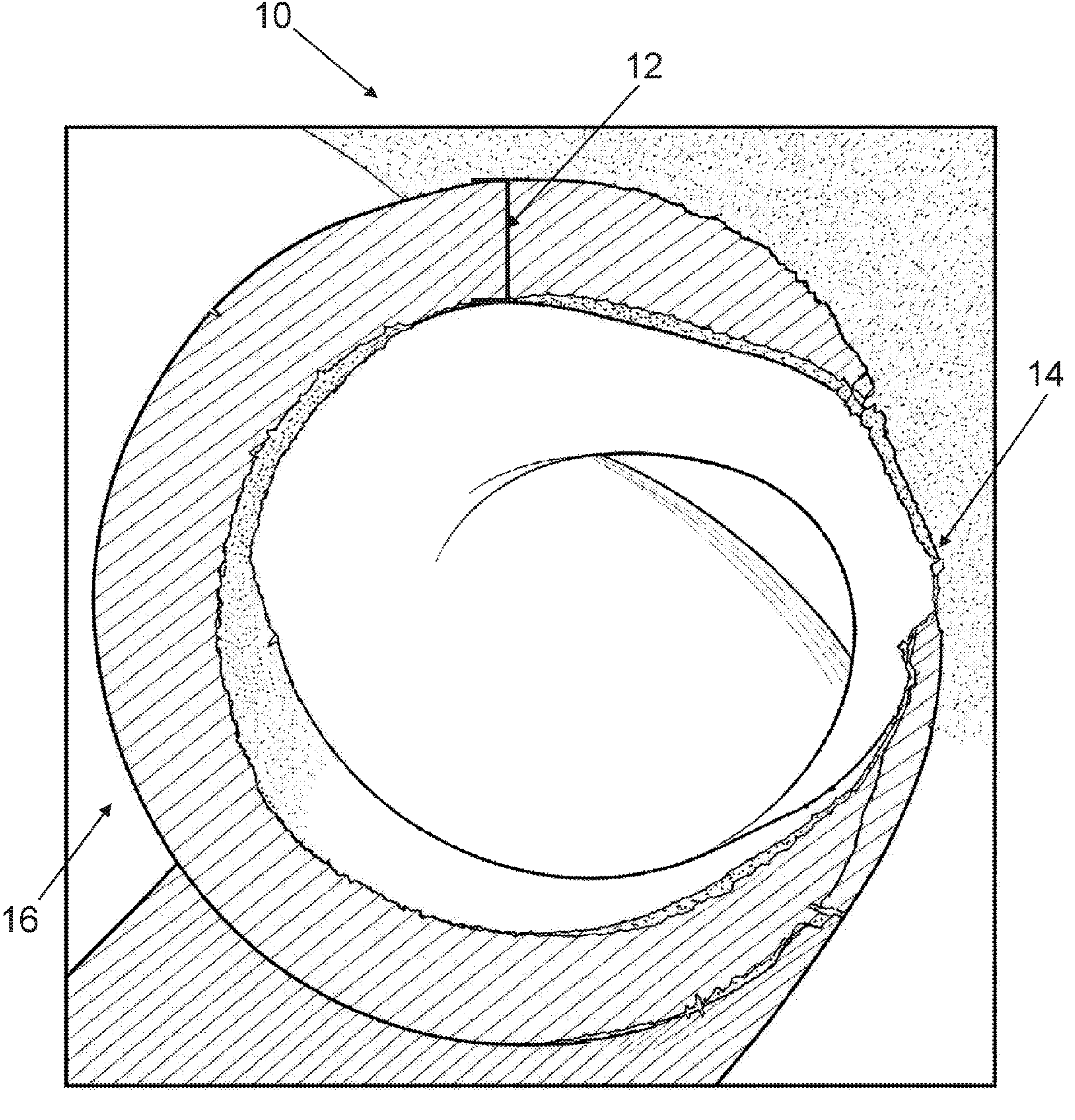
FIG. 1 is a photograph showing a sectional view of a pipe with irregular wear.
Figure 2:
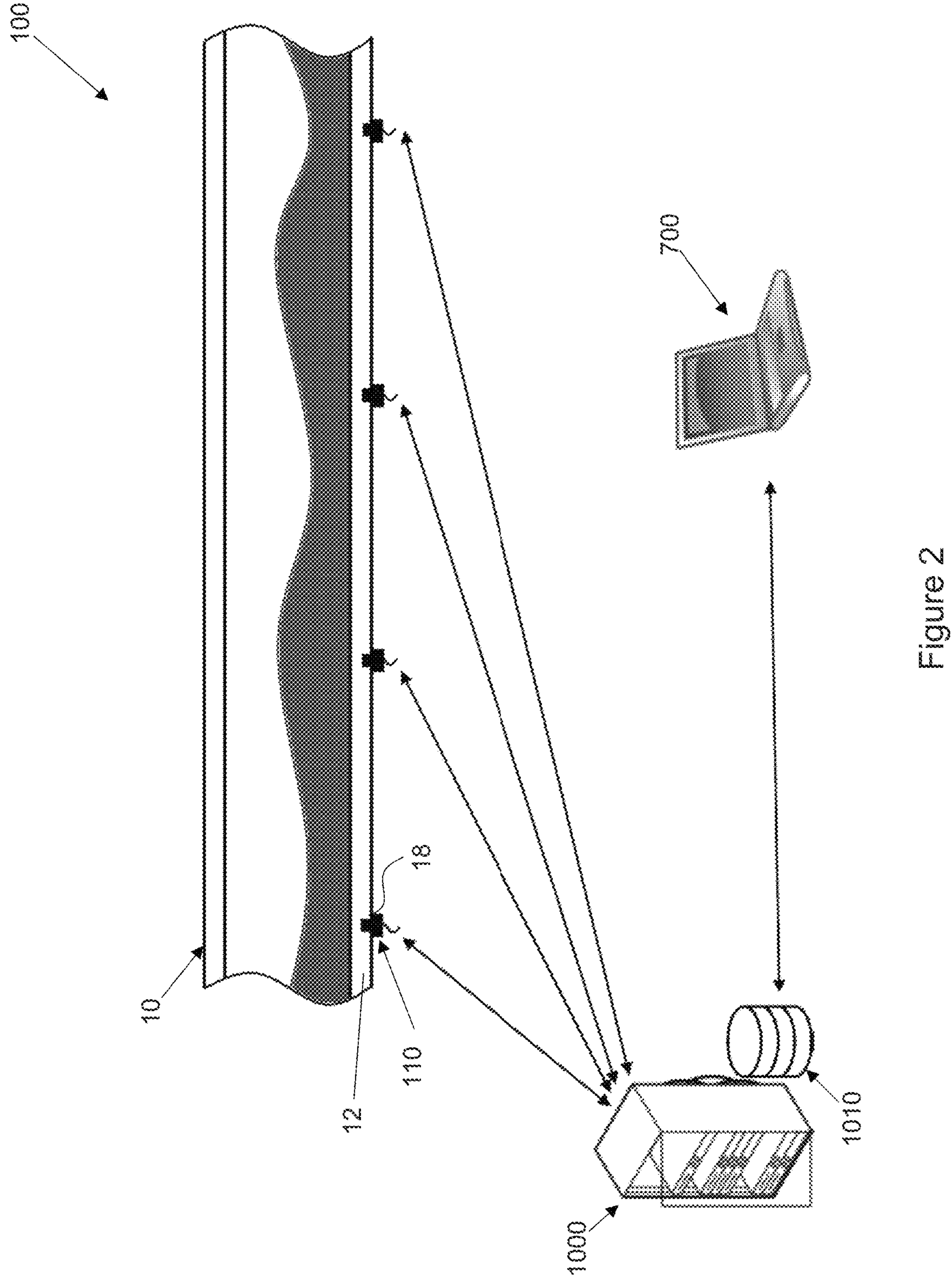
FIG. 2 is an illustration of a pipe wear monitoring system according to an embodiment of the present invention.

Referring to FIG. 2, in this first embodiment, the system (100) includes a plurality of wear sensors (110) spaced along a length of a pipe (10). Each wear sensor (110) is configured to detect wear in a wall (12) of the pipe (10).

The system (100) further includes a remotely accessible server (1000) operatively connected to the sensors (110) for receiving and monitoring data output from said sensors (110) in a periodic basis or in real-time. The server (1000) is configured to generate an alert in the form of an electronic notification to a computing device (700) of an operator or the like when said data received from any one of the sensors (110) is indicative of irregular wear in the wall (12) of the pipe (10).

Generally, the pipe (10) is a wear resistant pipe have a thickened sidewall (12) to at least partially delay wear failure.

The wear sensors (110) are spaced at regular 1 m intervals along a length of the pipe (10) and are mounted to a lower side or portion of the pipe (10).

Each wear sensor (110) is threadingly received in a sensor inlet port (18) defined in the outer surface of the sidewall (12) of the pipe (10). The sensor inlet port (18) includes an opening defined in the outer surface and extending partially towards an inner surface of the sidewall (12) but not through the inner surface of sidewall (12). The sensor inlet port (18) includes a threaded inner surface for threadingly engaging with an outer surface of the wear sensor (110).

Figure 5B:
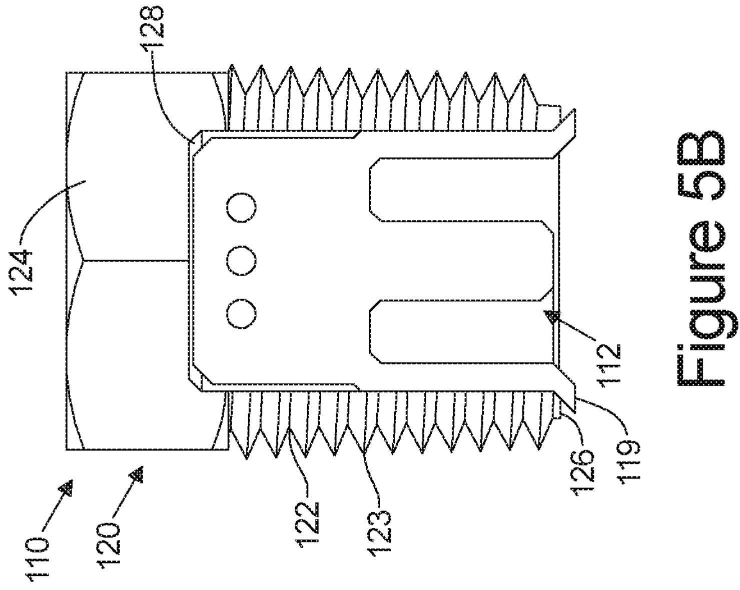
FIGS. 5A and 5B respectively show a wear sensor assembly according to an embodiment of the present invention.
Figure 5A:
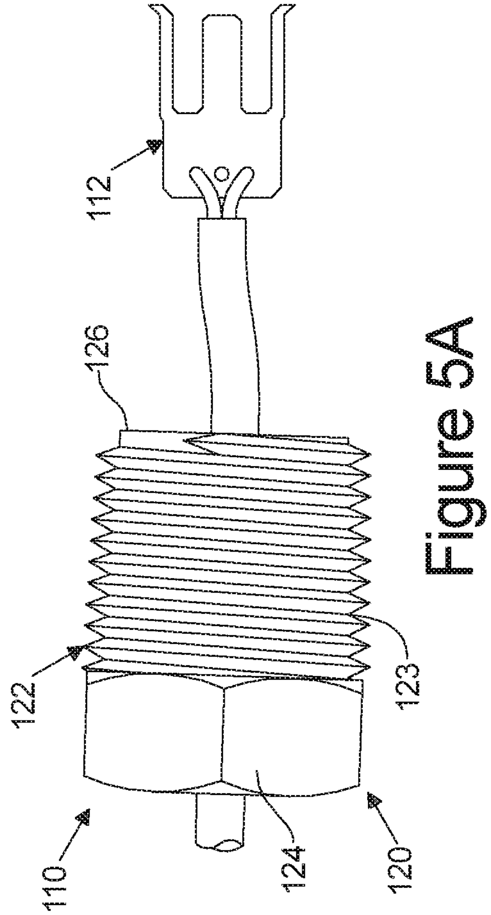

Referring to FIGS. 5A and 5B, the wear sensor (110) is an electronic sacrificial wear sensor. The wear sensor (110) includes a sacrificial probe (112) configured to be at least partially destroyed in response to wear in the sidewall (12; not shown) of a pipe (10; not shown). The partial destruction of the probe (112) being indicative of wear being detected.

Figure 6:
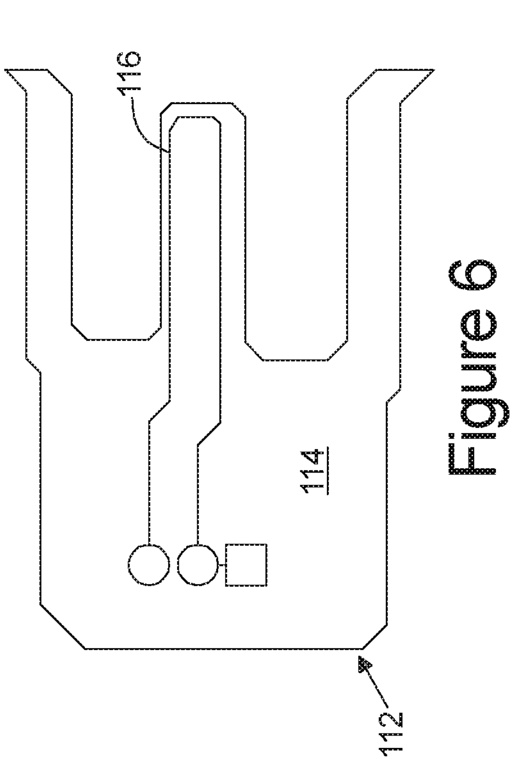
FIG. 6 is a schematic showing a probe of the wear sensor shown in FIGS. 5A and 5B.

Best shown in FIG. 6, the sacrificial probe (112) includes a board (114) having an electrical circuit (116) defined thereon. The board (114) and circuit (116) are configured to be at least partially destroyed in response to wear in the sidewall (12; not shown) of a pipe (10; not shown). As shown, the circuit (116) is printed at or near a distal outer end of the board (114) to thereby be sensitive to wear.

In use, the electrical circuit (116) is periodically polled by the system (100). When the electrical circuit (116) is intact, the circuit (116) generates a signal when polled indicative of the absence of irregular wear on the sidewall (112; not shown). When the circuit (116) is at least partially destroyed, the circuit (116) will not generate a signal when polled, thereby indicative of irregular wear on the sidewall (12; not shown).

Figure 7:
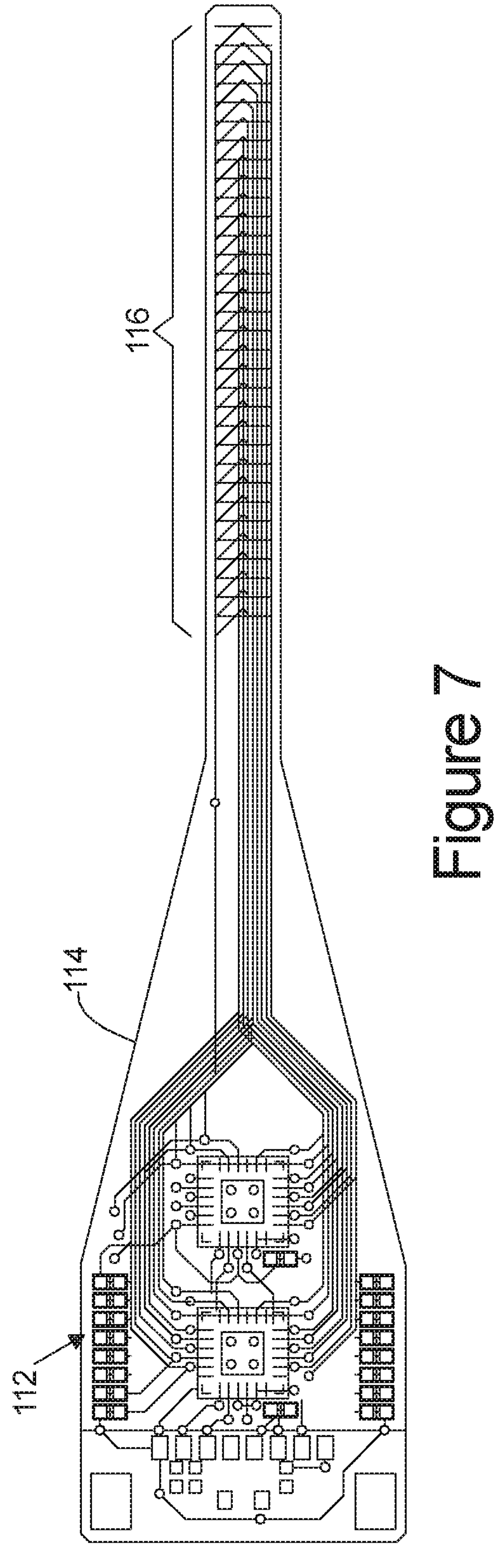
FIG. 7 is a schematic showing a probe of the wear sensor according to another embodiment of the present invention.

In FIG. 7, another embodiment of the sacrificial probe (112) is shown. The probe (112) again includes a board (114) having a plurality of electrical circuits (116) defined thereon. In this embodiment, the individual circuits (116) and the board (114) are configured to be sequentially at least partially destroyed in response to wear in the sidewall (12; not shown) of a pipe (10; not shown). Like with the sacrificial probe (112) shown in FIG. 6, the circuits (116) are printed at or near a distal outer end of the board (114) to thereby be sensitive to wear.

Advantageously, the sequential destruction of the individual circuits (116) enables wear in the sidewall (12; not shown) of the pipe (10; not shown) to be incrementally monitored and/or enables a wear rate to be determined.

Referring again to FIGS. 5A and 5B, the wear sensor (110) further includes a body (120) for at least partially housing the sacrificial probe (112) and for threadingly engaging with the sensor inlet port (18; not shown) defined in the outer surface of the sidewall (12; not shown) of the pipe (10; not shown).

The body (120) includes a shank (122) having a pair of opposed ends, including a head (124) at one of the opposed ends and a tip (126) at the other of the opposed ends of the shank (122).

The shank (122) is sized and shaped to at least partially extend within a sensor inlet port (18; not shown) and position the sacrificial probe (112) at or near the inner surface of the sidewall (12) of the pipe (10) for detecting wear. The shank (122) includes an external thread (123).

The head (124) is enlarged and sized and shaped such that it cannot be received within the sensor inlet port (18; not shown) but rather abuts against an outer surface of the wall (12) of the pipe (10).

As best shown in FIG. 5B, the head (124) includes a hexagonal profile shape for engaging with a tool, such as, e.g., a wrench, for applying torque to the body (120) and turning or rotating body (120) relative to the sensor inlet port (18; not shown) for installing and removing the wear sensor (110).

The tip (126) of the body (120) is square-tipped.

Again best shown in FIG. 5B, the body (120) further includes a first internal passage (128) extending through the body (120) from the tip (126) at least partially towards the head (124). The first internal passage (128) is suitably sized and shaped for receiving and holding in place the sacrificial probe (112).

Referring to FIG. 5A, the body (120) includes a second internal passage (not visible) extending through the head (124) of the body (120) and in fluid communication with the first internal passage (128) for passage of cables connected to the sacrificial probe (112). The second internal passage (not visible) has a narrower diameter or width than the first internal passage (128; shown in FIG. 5B) to prevent passage of the sacrificial probe (112) therethrough.

When assembling, the sacrificial probe (112) inserted into the body (120) via the tip (126) prior to the sensor (110) being at least partially inserted into and threadingly engaging with the sensor inlet port (18; not shown).

Best shown in FIG. 5B, the sacrificial probe (112) includes pair of outwardly turned ends (119) for engaging with the tip (126) of the body (120) and preventing over-insertion of the probe (112) into the body (120). The ends (119) of the sacrificial probe (112) at least partially hook or clip over the tip (126) of the body (120).

Referring back to FIG. 2, in this first embodiment, each wear sensor (110) includes a communications module in the form of a cellular or radio modem for connecting the sensors (110) to the remotely accessible server (1000) via a wireless network, which may include, among others, the Internet, LAN, WANs, GPRS network, a mobile communications network, a radio network (UHF-band).

The communications module is connected to the sacrificial probe (112; not shown) by an electrical circuit extending along at least one cable extending through the head (124; not shown) of the body (120).

Each sensor (110) furthers include a power supply for powering the sacrificial probe (112; not shown), the communications module and other electrical components of the sensor (110). The power supply includes one or more rechargeable batteries.

Each sensor (110) is addressable and reports an operational status to the remotely accessible server (1000), when polled.

The remotely accessible server (1000) includes one or more processors and one or more memory units containing executable instructions/software to be executed by the one or more processors.

The server (1000) is in communication with a pipe database (1010) containing a plurality of sensor records for each pipe being monitored. The server (1000) is linked to or can maintain the pipe database (1010). Each sensor record may include a sensor identifier. Each sensor record further includes a past record of the data output for the respective sensor (110).

In addition to receiving and monitoring, the remotely accessible server (1000) additionally collects and records the data output from the sensors (110) in the pipe database (1010).

The remotely accessible server (1000) further continuously or periodically monitors the pipe database (1010) for changes in the data output for any one of the plurality of sensors (110). The remotely accessibly server (1000) generates an alert when a change in the data output is indicative of a change in sensor operational status, such as, e.g., a sensor fail or failing sensor (imminent failure). The alert is generated to a computing device (700) of an operator or the like. The alert is an electronic notification, which will be described later.

The server (1000) is in communication with the plurality of sensors (110).

The server (1000) is configured to transmit communications to and receive communications from the sensors (110) via a wireless network, which may include, among others, the Internet, LANs, WANs, GPRS network, a mobile communications network, a radio network (UHF-band).

Responsive to the server (1000) receiving, monitoring and identifying data indicative of irregular wear, the server (1000) generates an alert to a computing device (700) of an operator or the like advising of the irregular wear.

The alert generated is an electronic notification and may be effected by way of Short Message Server (SMS) protocol, Unstructured Supplementary Service Data (USSD) protocol, over a secure Internet connection, or by way of data communication enabled by software on the computing device, for example.

The computing device can include a computer, a tablet, a smart phone, a smart watch or a PDA, for example.

Figure 8:
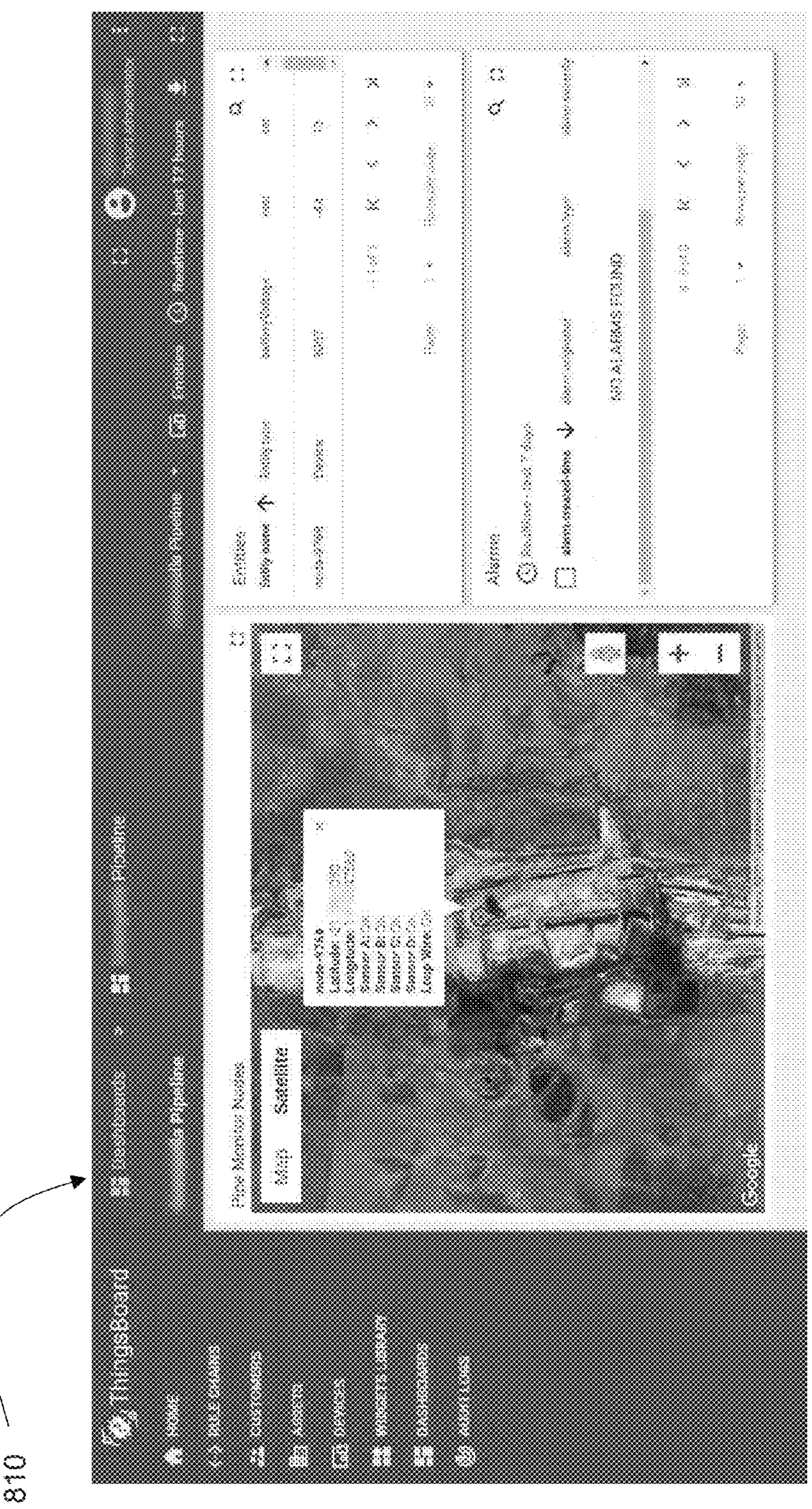
FIG. 8 is a screenshot of software for use in interacting with the system as shown in FIGS. 2 to 4.

Referring briefly to FIG. 8, this figure shows a screen-shot (810) of software run on a computing device (800; not shown) for controlling operation of the system (100; not shown).

As shown, the screen-shot (810) in this embodiment is reporting that the operational status of all sensors (110; not shown) is "OK". The screen-shot also shows a satellite view of the pipe (10; not shown).

Figure 3:
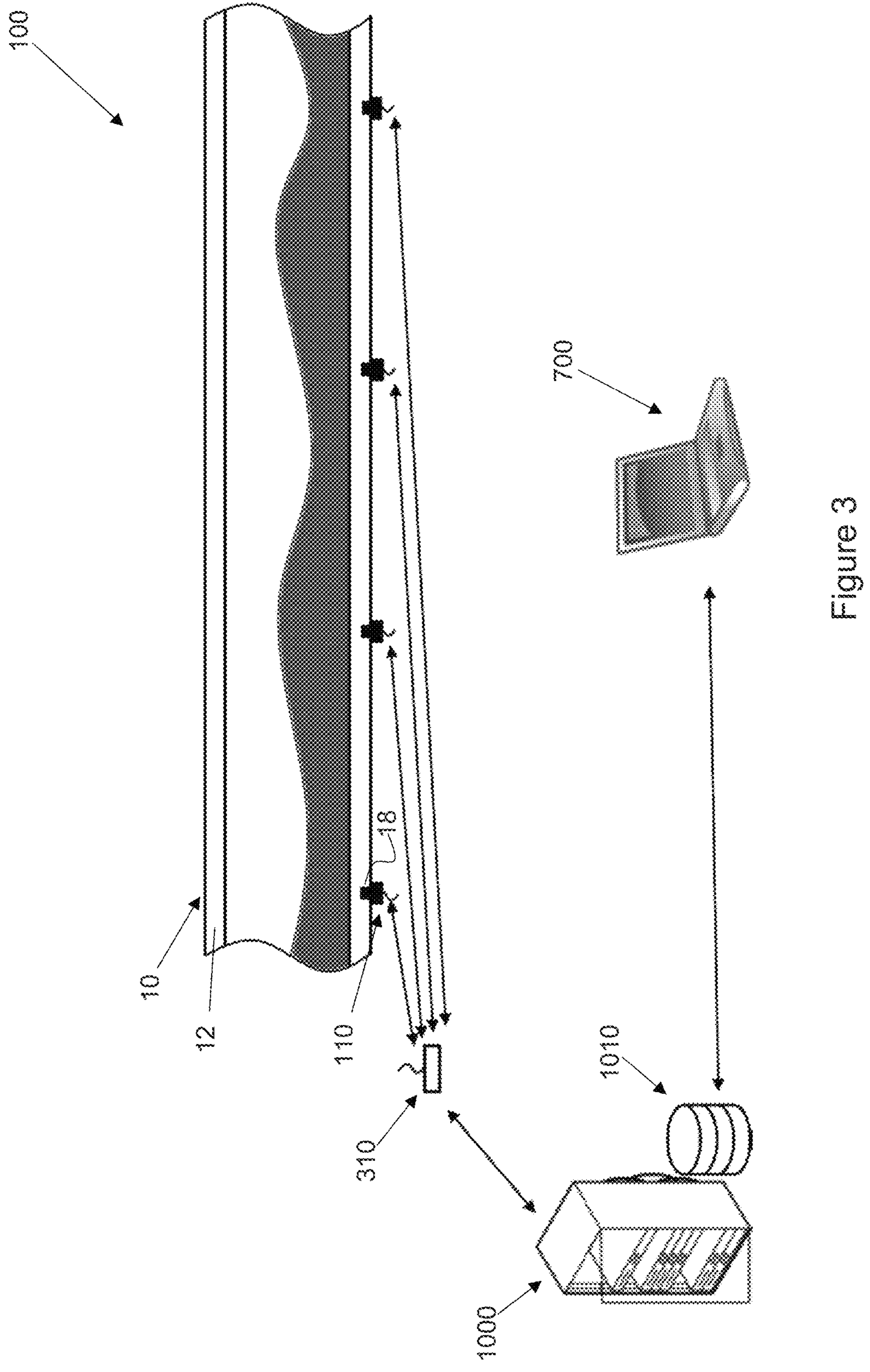
FIG. 3 is an illustration of a pipe wear monitoring system according to another embodiment of the present invention.

FIG. 3 shows a second embodiment of the system (100) for monitoring wear along a length of a pipe (10). For convenience, features that are similar or correspond to features of the first embodiment will again be referenced with the same reference numerals.

In this embodiment, the system (100) includes a base station (310) and a plurality of wear sensors (110) spaced along a length of a pipe (10) and operatively connected to the base station (310). Each wear sensor (110) is configured to detect wear in a wall (12) of the pipe (10).

The system (100) further includes a remotely accessible server (1000) operatively connected to the base station (310) for receiving and monitoring data output from the sensors (110) via the base station (310). The server (1000) is configured to generate an alert in the form of an electronic notification to a computing device (700) of an operator or the like when said data received from any one of the sensors (110) is indicative of irregular wear in the wall (12) of the pipe (10).

The wear sensors (110) in this embodiment are again spaced at regular 1 m intervals along a length of the pipe (10) and are mounted to a lower side or portion of the pipe (10).

Each wear sensor (110) is as previously described in respect of the first embodiment with the exception that the wear sensor (110) reports its operational status to the base station (310) when polled.

Each wear sensor (110) again includes a communication module in the form of a cellular or radio modem for wirelessly connecting the sensor (110) to the remotely accessible server (1000) via the base station (310). The base station (310) and the sensors (110) may be operatively connected via a wireless network, which may include, among others, the Internet, LANs, WANs, GPRS network, a mobile communications network or a radio network (UHF-band).

Generally, the base station (310) functions as a bridge between the plurality of sensors (110) and the remotely accessible server (1000).

The base station (310) is located at or near the pipe (10).

The base station (310) includes a body (312) sized and shaped for housing components and/or parts of the system (100), including at least one power source and a communications module. The body (312) is formed from a durable material or materials configured to withstand external environmental exposure, such as, e.g., plastic, concrete and/or metal material or materials.

The base station (310) includes a communications module in the form of a cellular or radio modem for wirelessly connecting to the sensors (110) and the remotely accessible server (1000).

The base station (310) further includes a power source in the form of one or more rechargeable batteries for powering at least the communications module.

The base station (310) also includes a microcomputer, including one or more processors and a memory, for receiving, monitoring and transmitting data between the remotely accessible server (1000) and the sensors (110). The one or more processors may be low power processors.

The processors include multiple inputs and outputs coupled to the communications module for the receiving and transmitting of data. In use, the base station (310) periodically or continuously addresses each sensor (110) and reports the operational status of the sensor (110) to the server (1000). The operational status includes whether the sensor (110) is operational, i.e., intact, an indication of any faults reported by the sensor (110), and/or an indication of the battery charge remaining.

Figure 4:
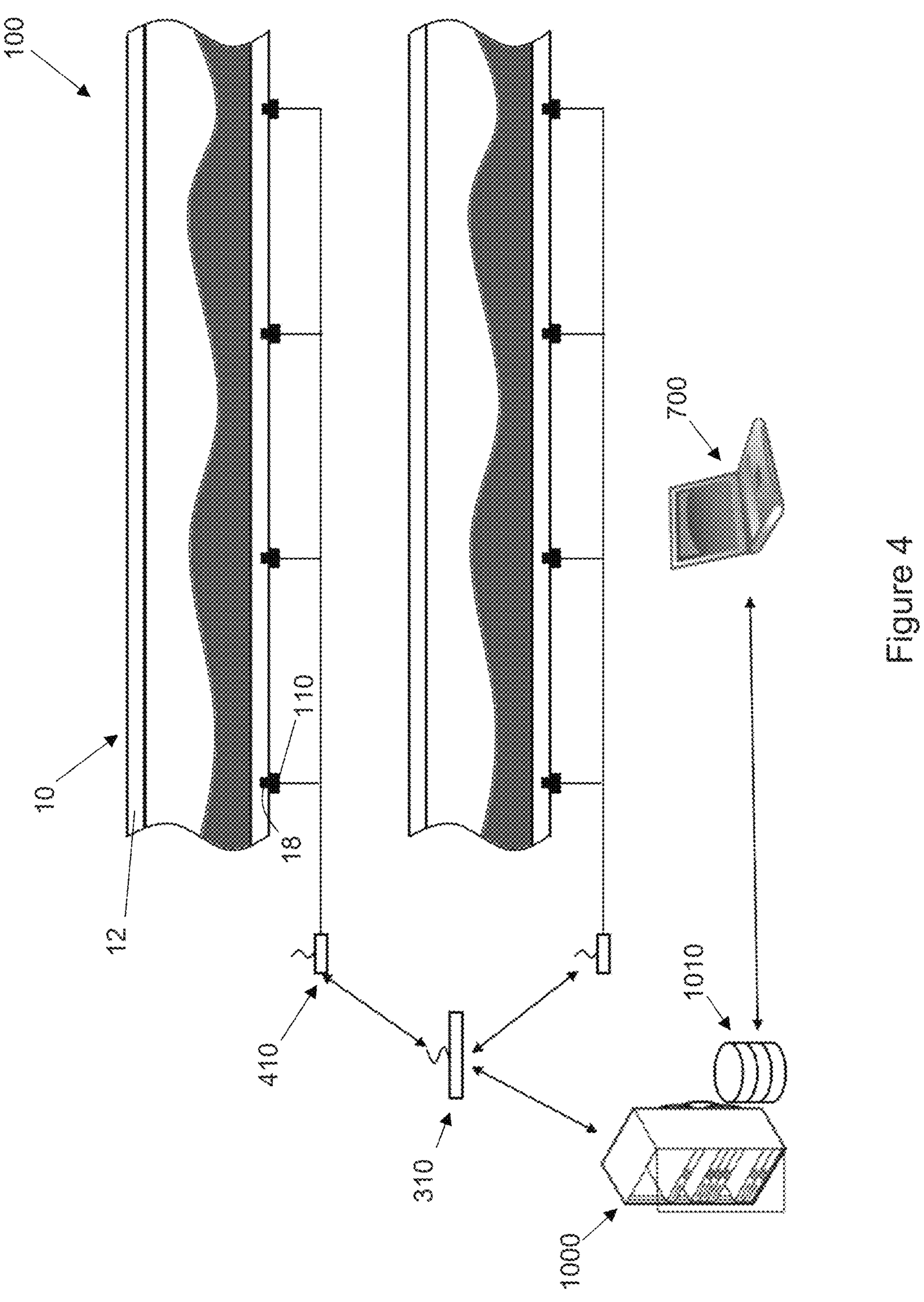
FIG. 4 is an illustration of a pipe wear monitoring system according to another embodiment of the present invention.

FIG. 4 shows a third embodiment of the system (100) for monitoring wear along a length of a pipe (10). For convenience, features that are similar or correspond to features of the first and second embodiments will again be referenced with the same reference numerals.

In this embodiment, the system (100) include a base station (310) and a plurality of sensor nodes (410) operatively connected to the base station (310). Each sensor node (410) is operatively associated with a plurality of wear sensors (110) and configured to detect wear in a wall (12) of the pipe (10).

The system (100) further includes a remotely accessible server (1000) operatively connected to the base station (310) for receiving and monitoring data output from the sensors (110) via the sensor nodes (410). The server (1000) is configured to generate an alert in the form of an electronic notification to a computing device (700) of an operator or the like when said data received from any one of the sensors (110) is indicative of irregular wear in the wall (12) of the pipe (10).

The wear sensors (110) in this embodiment are again spaced at regular 1 m intervals along a length of the pipe (10) and are mounted to a lower side or portion of the pipe (10).

Each wear sensor (110) is as previously described in respect of the first and second embodiments with the exception that the wear sensor (110) reports its operational status to the sensor node (310) when polled.

The sensor nodes (410) relay data between the sensors (110) and the server (1000), via the base station (310).

Like with the base station (310), each sensor node (410) includes a body (412) sized and shaped for housing components and/or parts of the system (100), including a power source and a communications module. The body (412) is formed from a durable material or materials configured to withstand external environmental exposure, such as, e.g., plastic, concrete and/or metal material or materials.

As shown, each sensor node (410) is operatively associated with four wear sensors (110) via a wired connection. Accordingly, each sensor node (410) is located at or near the pipe (10) in the immediate vicinity of the wear sensors (110) to which it is connected.

As indicated above, each sensor node (410) includes communication module for communicating with both the sensors (110) and the sever (800) via the base station (310). The communication module includes a port or access point for connecting the sensors (110) via a cable.

The communications module is in the form of a cellular or radio modem for wirelessly connecting to the base station (310).

Each sensor node (410) further includes a power source in the form of one or more rechargeable batteries for powering at least the communication module and polling the sensors (110).

Again and like with the base station (310), each sensor node (410) further includes a microcomputer, including one or more processors and a memory, for receiving, monitoring and transmitting data between the base station (310) and the sensors (110). The one or more processors are low power processors.

Again, the processors include multiple inputs and outputs coupled to the communications module for the receiving and transmitting of data. In use, each sensor node (410) periodically or continuously address each sensor (110) operatively associated with the node (410) and report the operational status of the sensor (110) and the node (410) to the remotely accessible server (1000) via the base station (310). The operational status again includes whether the sensor (110) is operational, i.e., intact, an indication of any faults reported by the sensor (110), and/or an indication of the battery charge remaining.

Figure 9:
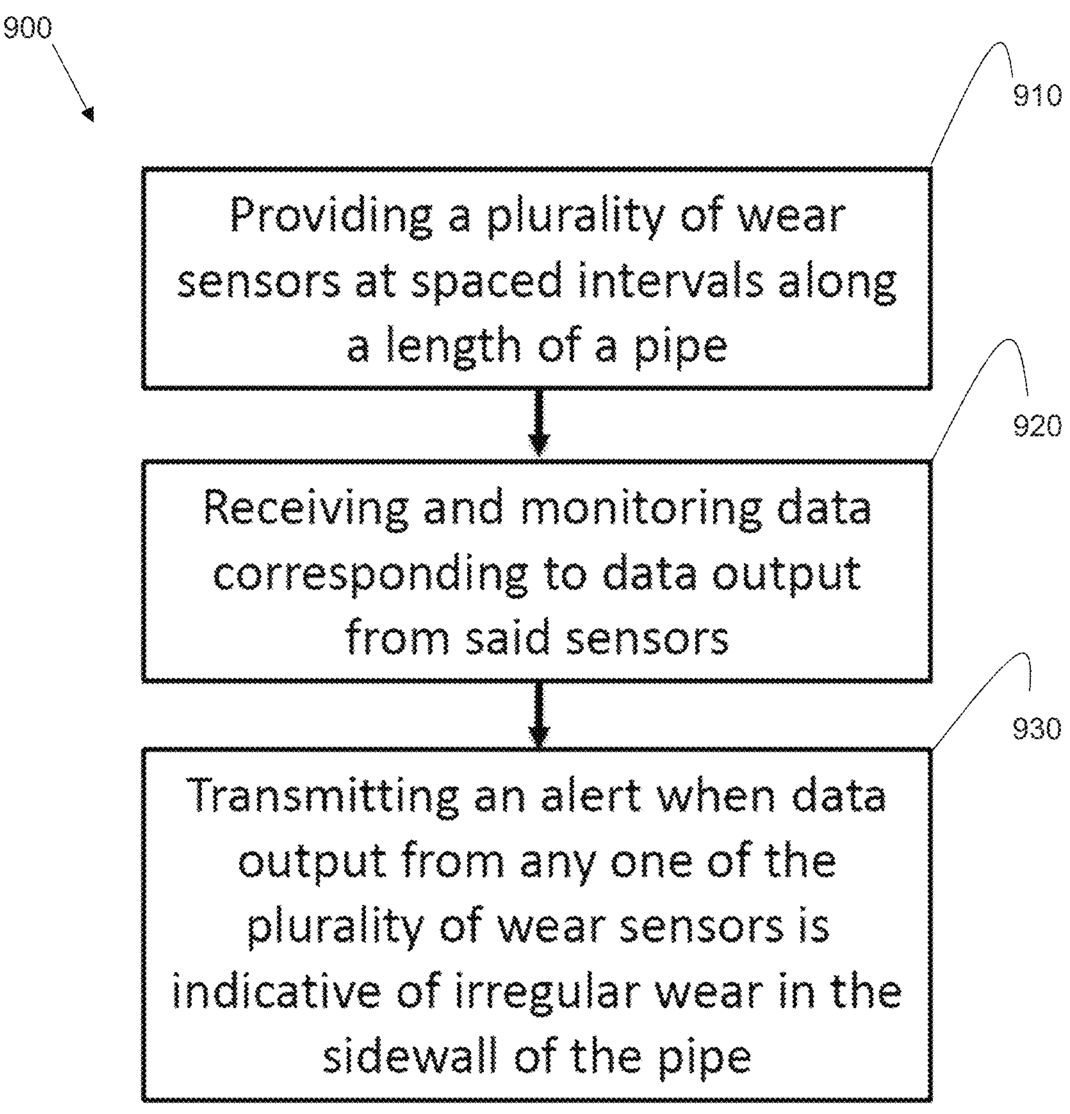
FIG. 9 is a flowchart showing steps in a method of monitoring pipe wear according to an embodiment of the present invention.

A method (900) of using the system (100) as shown in FIGS. 2 to 4 is now described in detail with reference to FIG. 9.

At step 910, the providing includes the forming of senor inlet ports (18; not shown) in the sidewall (12) of the pipe (10) at spaced intervals corresponding to the desired spaced intervals for the sensor (110). The threaded openings coinciding as the sensor inlet ports (18; not shown) can be thrilled into the sidewall (12) of the pipe (10).

Once the senor inlet ports (18; not shown) are formed in the sidewall (12) of the pipe (10), a sensors (110) can be threadingly received in each senor inlet port (18; not shown).

At step 920, the receiving and monitoring of data output from the sensors (110) includes addressing each sensor (110) to verify that the sensor probe (112; not shown) is intact. The verifying includes transmitting an electrical current through the electrical circuit (116; not shown) provided on the sensor probe (112; not shown), wherein a closed circuit is indicative that the sensor (110) is intact and wherein an interrupted or open circuit is indicative that the sensor (110) has been partially destroyed and thus irregular wear has occurred on a portion of the pipe (10) at least adjacent the sensor (110).

At step 930, responsive to the remotely accessible server (1000) identifying data indicative of irregular wear, the server (1000) generates an alert in the form of an electronic notification advising of the irregular wear to a computing or mobile device of an operator or the like.

The electronic notification can be effected by way of Short Message Server (SMS) protocol, Unstructured Supplementary Service Data (USSD) protocol, over a secure Internet connection, or by way of data communication enabled by software installed on the computing device.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art

What is claimed is:

1. A pipe wear monitoring system including:

at least one base station;

a plurality of wear sensors spaced along a length of a pipe and operatively connected to the at least one base station, each wear sensor being configured to detect wear in a wall of the pipe; and at least one remotely accessible server operatively connected to the base station for receiving and monitoring data output from said wear sensors via said at least one base station, said server configured to generate an alert when said data received from any one of the plurality of wear sensors is indicative of irregular wear in the wall of the pipe, wherein:

each wear sensor is a sacrificial wear sensor including a sacrificial probe configured to be at least partially destroyed in response to wear in a sidewall of the pipe; and each wear sensor includes a body for at least partially housing the sacrificial probe, the body being configured to be securely received in a sensor inlet port defined in an outer surface of a sidewall of the pipe that extends to an inner surface of the sidewall of the pipe, the body including:

a shank having a pair of opposed ends, a head at one of the opposed ends and a tip at the other of the opposed ends, and wherein the shank is sized and shaped such that it at least partially extends within the sensor inlet port; and an internal passage extending from the tip of the shank at least partially towards the head of the shank for receiving and holding in place the sacrificial probe and therewith position the sacrificial probe at or near the inner surface of the sidewall of the pipe when the body is securely received in the sensor inlet port so that the wear sensor is worn down as the inner surface of the sidewall of the pipe wears and incrementally detects wear in the inner surface of the sidewall of the pipe.

2. The system of claim 1 including:

a plurality of sensor nodes operatively connected to the at least one base station, each sensor node operatively associated with at least one of the plurality of wear sensor spaced along a length of the pipe, wherein the at least one remotely accessible server operatively connected to the base station receives and monitors data output from said wear sensors via said sensor nodes.

3. The system of claim 1, wherein the shank includes an external thread to threadingly engage with an internal thread provided in the sensor inlet port.

4. The system of claim 3, wherein the head is configured to abut against an outer surface of the wall of the pipe.

5. The system of claim 1, wherein the sacrificial probe includes a board having a plurality of electrical circuits defined thereon, each individual circuit of the plurality and the board configured to be sequentially at least partially destroyed in response to wear in a sidewall of the pipe, wherein sequential at least partially destruction of each said individual circuit enables wear in the sidewall to be incrementally monitored and a wear rate to be determined.

6. The system of claim 5, wherein the plurality of circuits are continuously or periodically polled by the system and wherein when the circuit or one of the plurality of circuits is intact, the circuit generates an electrical signal when polled indicative of an absence of irregular wear on the sidewall.

7. The system of claim 1, wherein the wear sensors are spaced at regular intervals along a length of the pipe.

8. The system of claim 1, wherein the wear sensors are electric sensors configured to generate an electronic signal when a sidewall of the pipe thins to a predetermined thickness.

9. The system of claim 1, wherein the at least one base station includes a communications module for connecting the plurality of sensor or sensor nodes and the at least one remotely accessible server.

10. The system of claim 9, wherein the communications module is a modem enabling the at least one base station to connect to the at least one remotely accessible server via a wireless network.

11. A method of monitoring pipe wear including:

providing a plurality of wear sensors at spaced intervals along a length of a pipe, each sensor being configured to detect wear in a wall of the pipe; and receiving and monitoring data corresponding to data output from said sensors and generating an alert when data is received from any one of the plurality of wear sensors indicative of irregular wear in the wall of the pipe, wherein:

the wear sensors are sacrificial wear sensors including a sacrificial probe configured to be at least partially destroyed in response to wear in a sidewall of the pipe; and, each wear sensor includes a body for at least partially housing the sacrificial probe, the body being configured to be securely received in a sensor inlet port defined in an outer surface of a sidewall of the pipe that extends to an inner surface of the sidewall of the pipe, the body including:

a shank having a pair of opposed ends, a head at one of the opposed ends and a tip at the other of the opposed ends, and wherein the shank is sized and shaped such that it at least partially extends within the sensor inlet port; and an internal passage extending from the tip of the shank at least partially towards the head of the shank for receiving and holding in place the sacrificial probe and therewith position the sacrificial probe at or near the inner surface of the sidewall of the pipe when the body is securely received in the sensor inlet port so that the wear sensor is worn down as the inner surface of the sidewall of the pipe wears and incrementally detects wear in the inner surface of the sidewall of the pipe.

12. The method of claim 11, wherein responsive to identifying data indicative of irregular wear, the alert is generated and transmitted to a computing or mobile device of an operator or the like.

13. The method of claim 12, wherein the alert is an electronic notification and is effected by way of SMS protocol, USSD protocol, over a secure internet connection or by way of data communication enabled by a software application installed on the computing device.

14. The method of claim 11, wherein the receiving and monitoring data includes periodically or continually addressing each wear sensor and wherein the absence of a response is indicative of partially destruction of the sensor and thus irregular wear on a portion of the pipe.

15. A pipe wear monitoring system including:

at least one base station;

a plurality of sensor nodes operatively connected to the at least one base station, each sensor node operatively associated with at least one wear sensor spaced along a length of a pipe and configured to detect wear in a wall of the pipe; and at least one remotely accessible server operatively connected to the base station for receiving and monitoring data output from said sensors via said sensor nodes, said server configured to generate an alert when said data received from any one of the plurality of wear sensors is indicative of irregular wear in the wall of the pipe, wherein:

each wear sensor is a sacrificial wear sensor including a sacrificial probe configured to be at least partially destroyed in response to wear in an inner sidewall of the pipe; and, the sacrificial probe includes a board having a plurality of electrical circuits defined thereon, each individual circuit of the plurality and the board configured to be sequentially at least partially destroyed in response to wear in a sidewall of the pipe, wherein sequential at least partially destruction of each said individual circuit enables wear in the sidewall to be incrementally monitored and a wear rate to be determined; and each wear sensor includes a body for at least partially housing the sacrificial probe, the body being configured to be securely received in a sensor inlet port defined in an outer surface of a sidewall of the pipe that extends to an inner surface of the sidewall of the pipe, the body including:

a shank having a pair of opposed ends, a head at one of the opposed ends and a tip at the other of the opposed ends, and wherein the shank is sized and shaped such that it at least partially extends within the sensor inlet port; and an internal passage extending from the tip of the shank at least partially towards the head of the shank for receiving and holding in place the sacrificial probe and therewith position the sacrificial probe at or near the inner surface of the sidewall of the pipe when the body is securely received in the sensor inlet port so that the wear sensor is worn down as the inner surface of the sidewall of the pipe wears and incrementally detects wear in the inner surface of the sidewall of the pipe.

16. The system of claim 15, wherein the plurality of circuits are continuously or periodically polled by the system and wherein when the circuit or one of the plurality of circuits is intact, the circuit generates an electrical signal when polled indicative of an absence of irregular wear on the sidewall.

17. The system of claim 15, wherein the wear sensors are spaced at regular intervals along a length of the pipe.

18. The system of claim 15, wherein the wear sensors are electric sensors configured to generate an electronic signal when a sidewall of the pipe thins to a predetermined thickness.

19. The system of claim 15, wherein the at least one base station includes a communications module for connecting the plurality of sensor or sensor nodes and the at least one remotely accessible server.

* * * * *